(12) United States Patent  
Clauser et al.

(10) Patent No.: US 9,272,736 B1  
(45) Date of Patent: Mar. 1, 2016

(54) VEHICLES HAVING A DASH PANEL REINFORCEMENT MEMBER

(71) Applicant: Toyota Motor Engineering & Manufacturing North America, Inc., Erlanger, KY (US)

(72) Inventors: Mark D. Clauser, Saline, MI (US); Ronald Bowers, New Hudson, MI (US); Manikandan Baby Mony, Saline, MI (US); Naipaul Ramoutar, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/476,204

(22) Filed: Sep. 3, 2014

(51) Int. Cl.
*B60N 99/00* (2006.01)
*B62D 25/14* (2006.01)
*B62D 25/02* (2006.01)

(52) U.S. Cl.
CPC .............. *B62D 25/14* (2013.01); *B62D 25/025* (2013.01)

(58) Field of Classification Search
CPC .............................. B62D 25/14; B62D 25/025
See application file for complete search history.

(56) References Cited

U.S. PATENT DOCUMENTS

| 5,087,074 | A | 2/1992 | Komatsu et al. |
| 6,631,942 | B1 | 10/2003 | Kitagawa |
| 8,469,442 | B1 | 6/2013 | Pencak et al. |
| 2002/0063445 | A1* | 5/2002 | Takeuchi ............. B62D 25/082 296/204 |
| 2002/0195840 | A1* | 12/2002 | Mishima ............... B62D 25/06 296/203.01 |
| 2004/0140693 | A1* | 7/2004 | Gibbianelli .......... B62D 21/152 296/203.01 |
| 2006/0061143 | A1* | 3/2006 | Okana .................... B62D 21/10 296/204 |
| 2013/0264843 | A1 | 10/2013 | Toba |
| 2014/0125030 | A1 | 5/2014 | Hara |

FOREIGN PATENT DOCUMENTS

| JP | 61-75382 | 5/1986 |
| JP | 2013252775 | 12/2013 |

\* cited by examiner

*Primary Examiner* — Lori L Lyjak
(74) *Attorney, Agent, or Firm* — Dinsmore & Shohl LLP

(57) ABSTRACT

Vehicle structures for dissipating and distributing energy associated with a collision are described herein. In one embodiment, a vehicle includes a side support extending in a vehicle longitudinal direction, a rocker support extending in the vehicle longitudinal direction, where the rocker support is positioned outboard of the side support in a vehicle lateral direction, a torque box extending in the vehicle lateral direction, a dash panel coupled to the torque box, where the dash panel comprises an engine room barrier portion extending upward from the torque box and a floor attachment portion extending downward from the torque box, and a reinforcement member positioned between the side support and the rocker support, where the reinforcement member is spaced apart from the side support and the rocker support, and where the reinforcement member is coupled to the engine room barrier portion and the floor attachment portion of the dash panel.

19 Claims, 4 Drawing Sheets

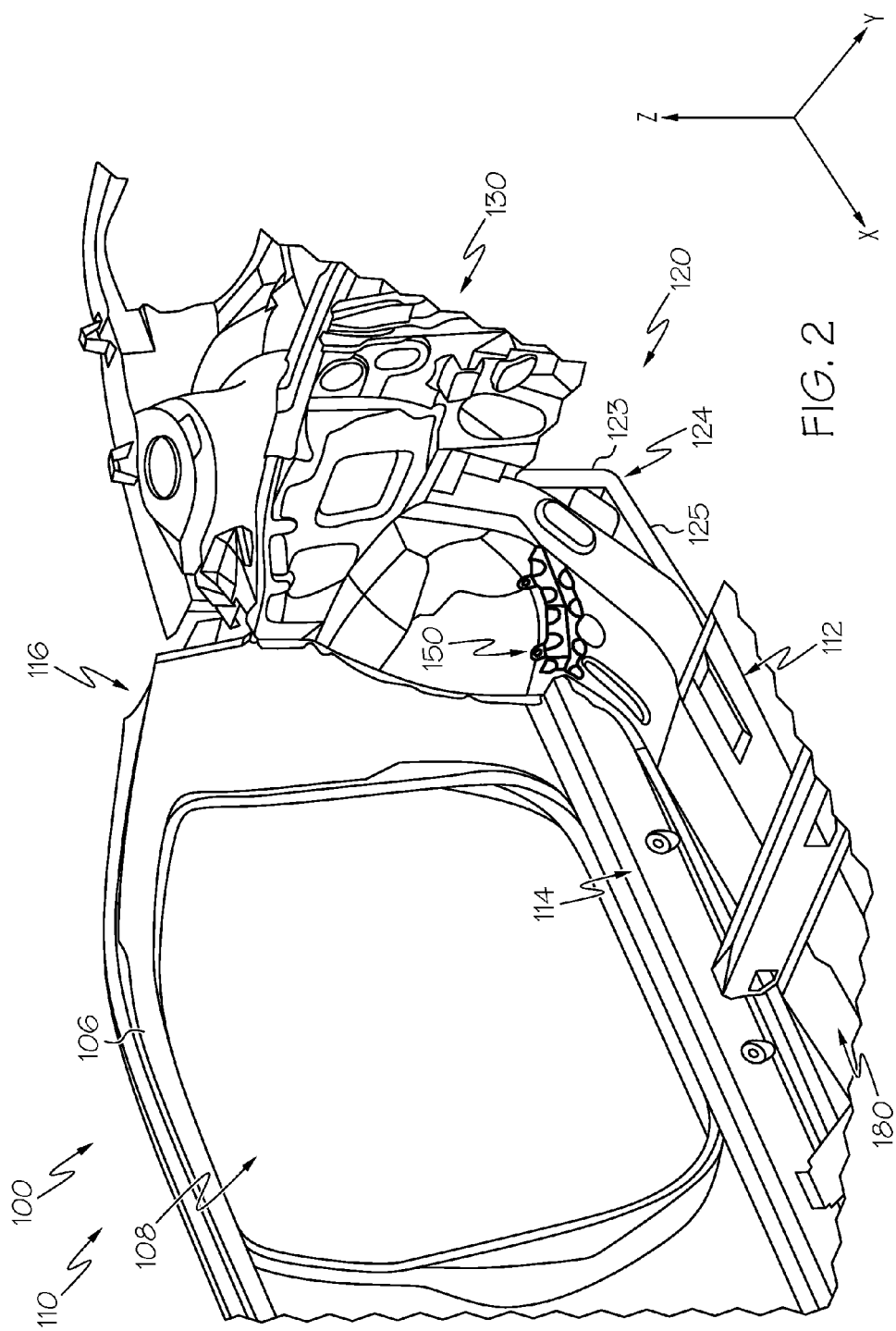

VEHICLES HAVING A DASH PANEL REINFORCEMENT MEMBER

TECHNICAL FIELD

The present specification generally relates to vehicles that include reinforcement members for transferring and absorbing energy in the event of an impact and, more specifically, to vehicles that include one or more reinforcement members that are coupled to a dash panel.

BACKGROUND

Vehicles may be equipped with bumper systems and crash protection structures that elastically and plastically deform to absorb energy in the event of a collision.

In one example, a substantial portion of energy from an impact with a small front bumper overlap may be directed outboard of many of the energy absorbing structures of the vehicle and may be directed into a front wheel, which causes the front wheel to be directed in a generally rearward direction. Because a substantial portion of the energy from the impact is directed into the bumper assembly at a position that is outboard of many of the energy absorbing structures of the vehicle, the energy from the impact may not be absorbed or may only be partially absorbed by those energy absorbing structures of the vehicle. The unabsorbed energy may be directed into a front wheel and transferred rearward along the vehicle as the front wheel contacts vehicle structures proximate to a passenger cabin of the vehicle.

Accordingly, a need exists for alternative structures for transferring energy and absorbing energy from a small front bumper overlap collision.

SUMMARY

In one embodiment, a vehicle includes a side support extending in a vehicle longitudinal direction, a rocker support extending in the vehicle longitudinal direction, where the rocker support is positioned outboard of the side support in a vehicle lateral direction that is transverse to the vehicle longitudinal direction, a torque box extending in the vehicle lateral direction, a dash panel coupled to the torque box, where the dash panel comprises an engine room barrier portion extending upward from the torque box and a floor attachment portion extending downward from the torque box, a wheel positioned forward of the torque box in the vehicle longitudinal direction, and a reinforcement member positioned between the side support and the rocker support, where the reinforcement member is spaced apart from the side support and the rocker support, and where the reinforcement member is coupled to the engine room barrier portion of the dash panel and the floor attachment portion of the dash panel.

In another embodiment, a vehicle includes a side support extending in a vehicle longitudinal direction, a rocker support extending in the vehicle longitudinal direction, where the rocker support is positioned outboard of the side support in a vehicle lateral direction that is transverse to the vehicle longitudinal direction, a torque box extending in the vehicle lateral direction, the torque box including an upper portion and a lower portion, where the upper portion of the torque box has a compressive strength that is less than a compressive strength of the lower portion of the torque box, a dash panel coupled to the upper portion of the torque box, where the dash panel includes an engine room barrier portion extending upward from the torque box and a floor attachment portion extending downward from the torque box, a wheel positioned forward of the torque box in the vehicle longitudinal direction, and a reinforcement member coupled to the dash panel and the upper portion of the torque box, where the reinforcement member, the dash panel, and the upper portion of the torque box have a composite compressive strength that is at least 30% of the compressive strength of the lower portion of the torque box.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 2 schematically depicts a perspective view of a vehicle including a dash panel, a torque box, and a reinforcement member according to one or more embodiments shown or described herein;

DETAILED DESCRIPTION

Figure 1:
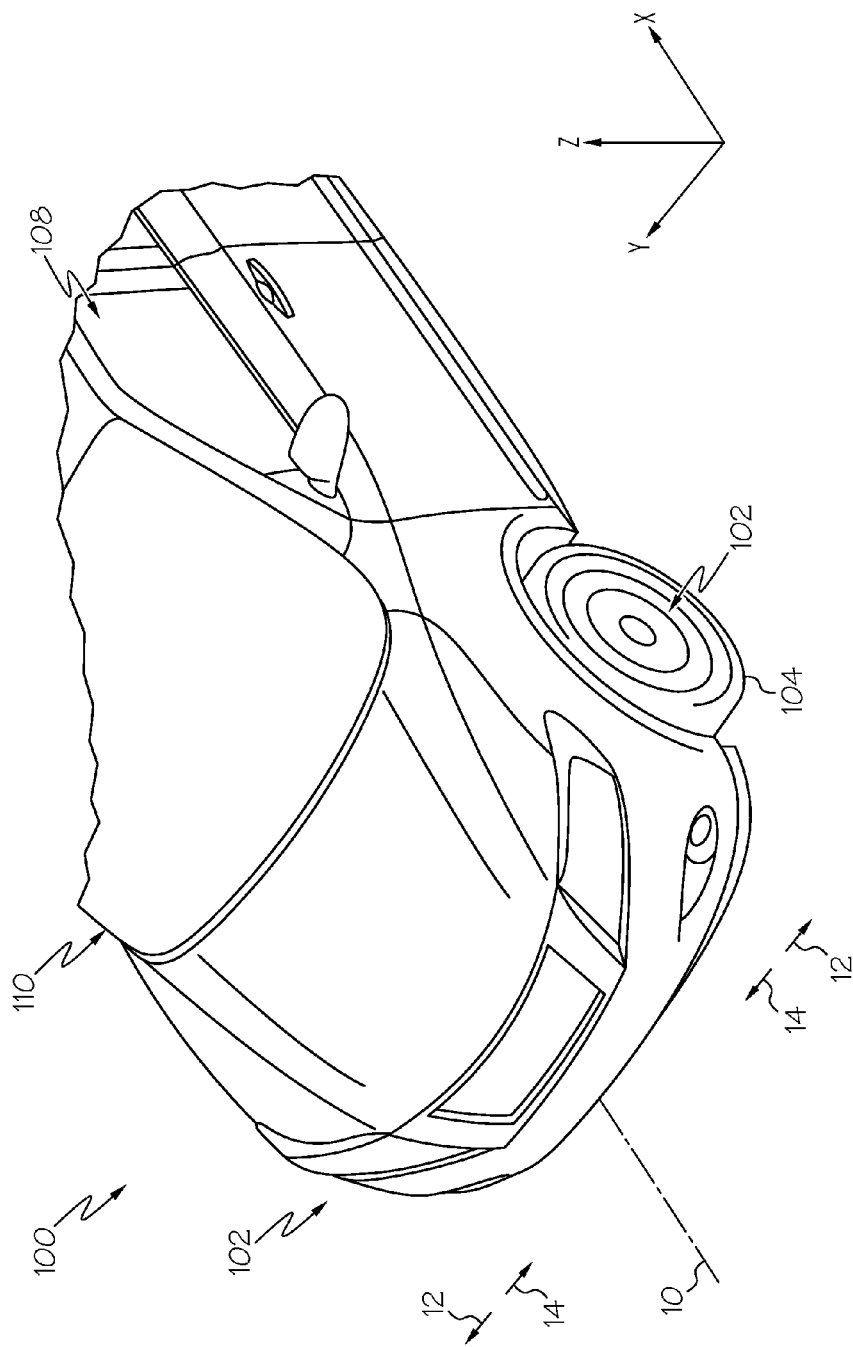
FIG. 1 schematically depicts a perspective view of a vehicle according to one or more embodiments shown or described herein.

Vehicles according to the present specification include a side support that extends in a vehicle longitudinal direction and a rocker support that extends in the vehicle longitudinal direction, where the rocker support is positioned outboard from the side support. The vehicles further include a torque box that extends in a vehicle lateral direction that is transverse to the vehicle longitudinal direction. A dash panel is coupled to the torque box, where the dash panel includes an engine room barrier portion that extends upward from the torque box and a floor attachment portion that extends downward from the torque box. A wheel is positioned forward of the torque box in the vehicle longitudinal direction. A reinforcement member is positioned between the side support and the rocker support, where the reinforcement member is coupled to the engine room barrier portion of the dash panel and the floor attachment portion of the dash panel. In some embodiments, the reinforcement member is spaced apart from and positioned between the side support and the rocker support. In some embodiments, the reinforcement member is coupled to the dash panel and an upper portion of the torque box. The reinforcement member, the dash panel, and the upper portion of the torque box may have a composite compressive strength that is within at least 30% of the compressive strength of a lower portion of the torque box. These and other embodiments will be described in more detail below in reference to the appended drawings.

As used herein, the term "vehicle longitudinal direction" refers to the forward-rearward direction of the vehicle (i.e., in the +/− vehicle X-direction depicted in FIGS. 1-3B). The term "vehicle lateral direction" refers to the cross-vehicle direction (i.e., in the +/− vehicle Y-direction depicted in FIGS. 1-3A), and is transverse to the vehicle longitudinal direction. Further, the terms "inboard" and "outboard" are used to describe the relative positioning of various components of the vehicle. Referring to FIGS. 1-3B, the term "outboard" as used herein refers to the relative location of a component in direction 12 with respect to a vehicle centerline 10. The term "inboard" as used herein refers to the relative location of a component in direction 14 with respect to the vehicle centerline 10. Because the vehicle structures may be generally symmetrical about the vehicle centerline 10, the direction to which use of terms "inboard" and "outboard" refer may be mirrored about the vehicle centerline 10 when evaluating components positioned along opposite sides of the vehicle 100.

Further, as used herein, the term "compressive strength" and "composite compressive strength" refers to the plastic moment of assemblies of components described herein, in particular, a first assembly including the dash panel, an upper portion of the torque box, and an upper reinforcement member and a second assembly including a lower portion of the torque box and a lower reinforcement member. The plastic moment of the assemblies corresponds to a maximum bending moment that may be sustained about a principal axis of the assemblies as a result of a force applied to the various components in the vehicle longitudinal direction, such as may be applied as a result of a collision. The plastic moment of the assemblies may be estimated through a variety of techniques, including manual calculation evaluating the geometry and material properties of the assemblies, as well as Computer Aided Engineering (CAE) simulation.

Referring initially to FIG. 1 and also to FIG. 2 where a vehicle 100 is depicted with certain body panels removed for clarity. The vehicle 100 includes a unibody 110 onto which a vehicle drivetrain is coupled. The unibody 110 includes a pair of front suspension mounts and a pair of rear suspension mounts to which the front suspension units and the rear suspension units of the vehicle 100 are generally attached. The vehicle 100 also includes a cabin 108 that is integral with the unibody 110. The cabin 108 generally defines a passenger cabin of the vehicle 100.

Motor vehicles that incorporate elements according to the present disclosure may include a variety of construction methodologies that are conventionally known, including the unibody construction methodology depicted in FIGS. 1-3B as well as a body-on-frame construction methodology. While the embodiments of the present disclosure are described and depicted herein in reference to unibody structures, it should be understood that vehicles that are constructed with body-on-frame construction may incorporate the elements that are shown and described herein.

Referring to FIG. 2, the unibody 110 includes a pair of side supports 112 that are spaced apart from one another in the vehicle in a vehicle lateral direction. In the depicted embodiments, one side support 112 is shown. However it should be understood that the description made herein to one of the side supports 112 may apply to both side supports 112 that are positioned along opposite sides of the vehicle.

The side supports 112 extend in a vehicle longitudinal direction (i.e., in the +/− vehicle X-direction depicted in FIGS. 1-3B). The side supports 112 may extend between at least the front suspension mounts and rear suspension mounts that are positioned rearward of the front suspension mounts in the vehicle longitudinal direction. In ordinary vehicle operation, the side supports 112 may contribute to overall vehicle stiffness. In vehicle embodiments exhibiting unibody construction, the side supports 112 may be integral with the unibody 110, such that the side supports 112 are incorporated into the cabin 108. For example, the side supports 112 may form a portion of the floor 180 of the cabin 108. In other vehicle embodiments, including, for example, vehicle embodiments exhibiting body-on-frame construction, the side supports 112 may be separately attached to the cabin 108.

The vehicle 100 includes a pair of front suspension units 102 that are coupled to the side supports 112 at the front suspension mounts. The front suspension units 102 may generally include vehicle components that connect the unibody 110 to a wheel 104. These components may include control arms, steering links, and a front chassis member including a spring and a strut. The spring and the strut may be coupled to a knuckle assembly including a hub. A wheel 104 may be coupled to the hub.

Referring to FIG. 2, the unibody 110 includes a pair of rocker supports 114 that extend in the vehicle longitudinal direction, and are generally parallel to the side supports 112 of the unibody 110. The pair of rocker supports 114 are positioned outboard from the side supports 112 of the unibody 110. The rocker supports 114 may be positioned proximate to lower portion of the door opening of the cabin 108 and rearward of the wheels 104 of the front suspension units 102. The rocker supports 114 may also be positioned proximate to a floor 180 of the cabin 108. In the depicted embodiments, one rocker support 114 is shown. However, it should be understood that the description made herein to one of the rocker supports 114 may apply to both of the rocker supports 114 that are positioned along opposite sides of the vehicle.

Still referring to FIG. 2, the unibody 110 includes an A-pillar 116. The A-pillar 116 may extend generally upward in a vertical direction from the pair of rocker supports 114 to support a side rail 106. The unibody 110 may further include a B-pillar and a C-pillar.

Figure 3A:
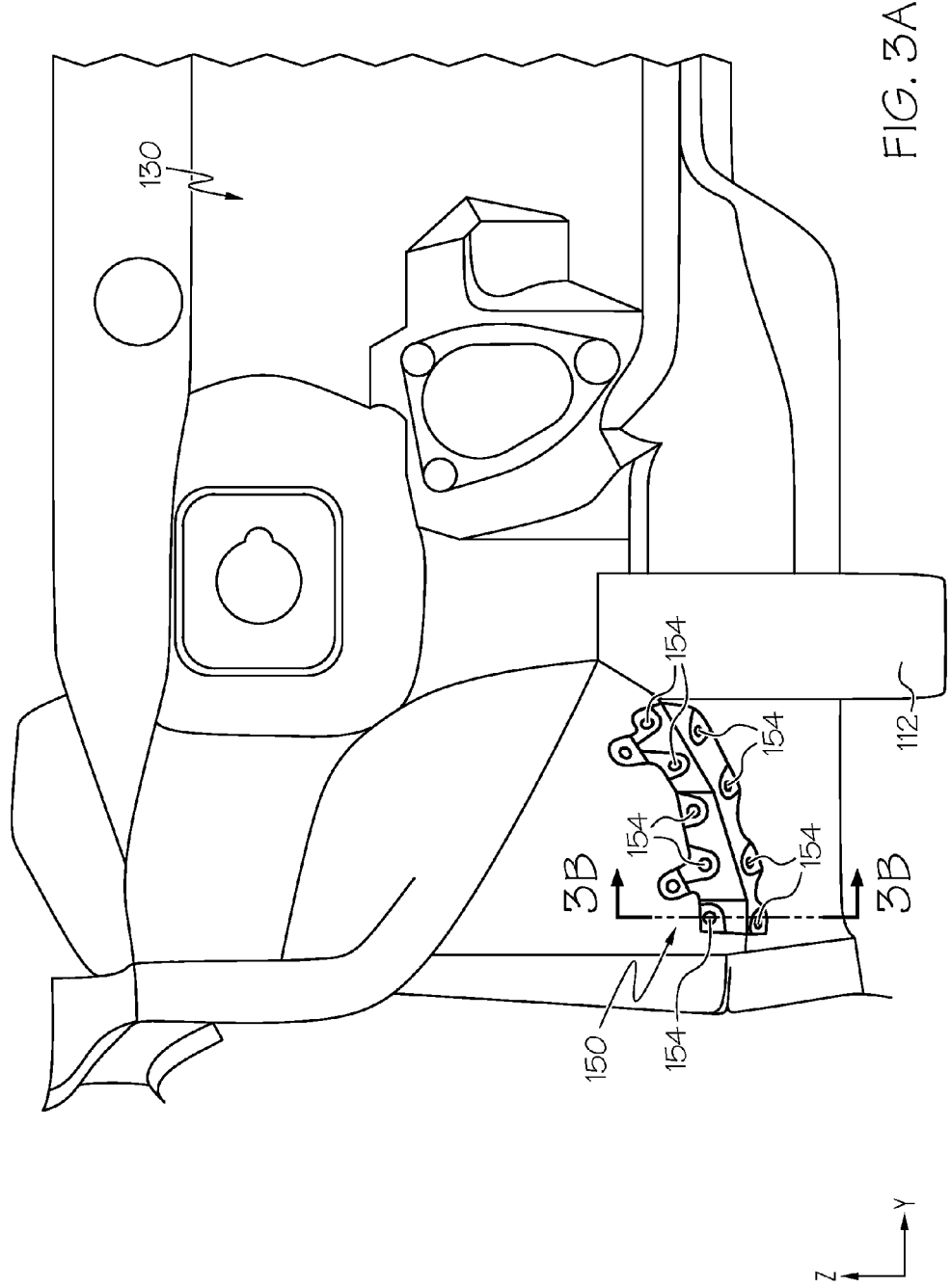
FIG. 3A schematically depicts a front view of a dash panel and a reinforcement member according to one or more embodiments shown or described herein.
Figure 3B:
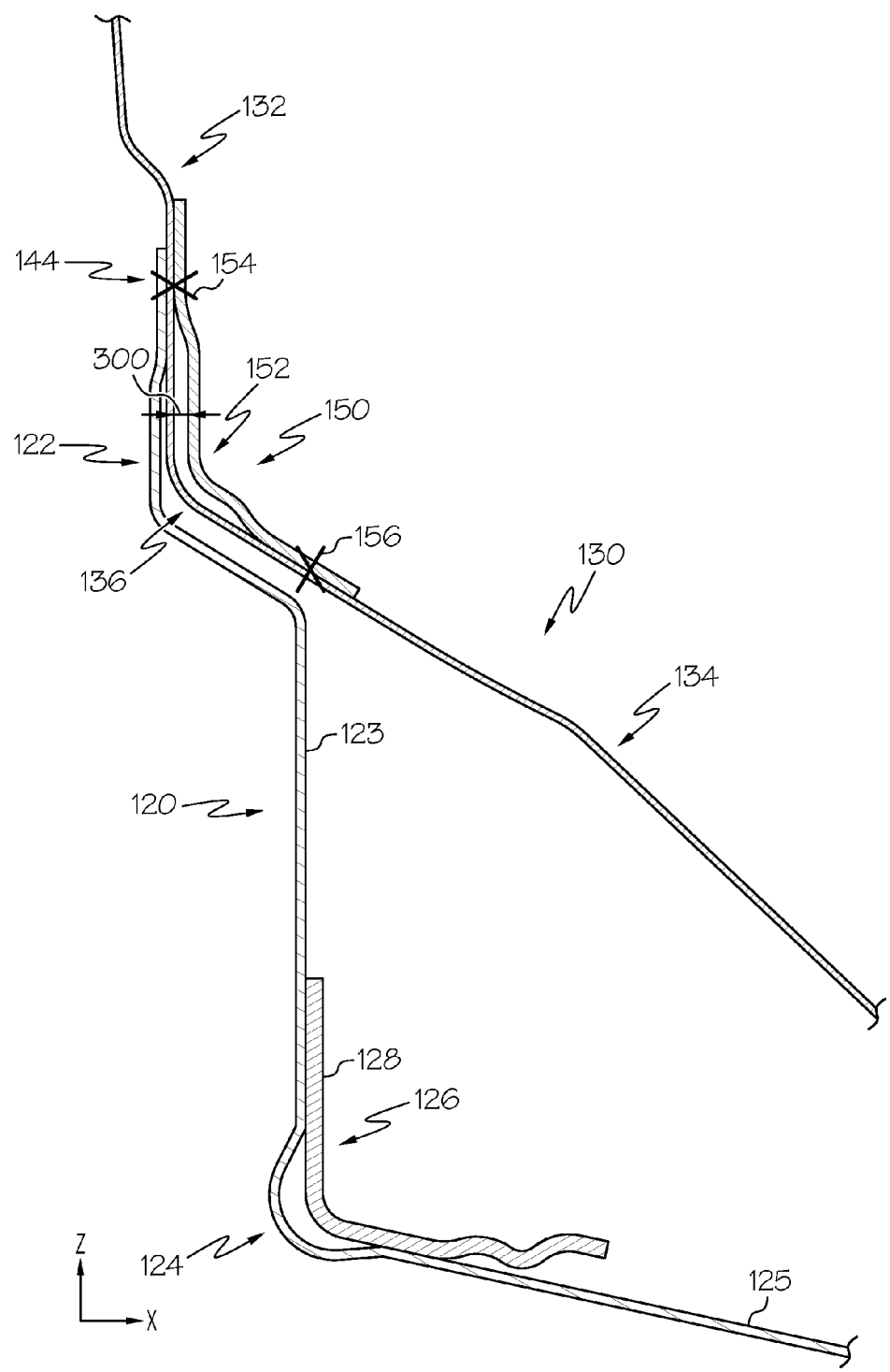
FIG. 3B schematically depicts a section view of a dash panel, a torque box, and a reinforcement member along 3B-3B depicted in FIG. 3A according to one or more embodiments shown or described herein.

Referring to FIGS. 2-3B, a dash panel 130 extends across the unibody 110 in the vehicle lateral direction. The dash panel 130 also extends upward in a generally vertical direction (i.e., in the + vehicle Z-direction depicted in FIGS. 1-3B) from the pair of rocker supports 114. In embodiments, the dash panel 130 may be coupled to the A-pillar 116, the rocker supports 114, and the side supports 112. The dash panel 130 may be coupled to the A-pillar 116, the side supports 112, and the rocker supports 114 with a variety of attachments including, for example and without limitation, welded joints, brazed joints, mechanical fasteners, and structural adhesives.

Referring to FIGS. 2 and 3B, the dash panel 130 is coupled to a torque box 120 at a torque box/dash panel interface 144. The dash panel 130 may be coupled to the torque box 120 at the torque box/dash panel interface 144 through a variety of attachments including, for example and without limitation, welded joints, brazed joints, mechanical fasteners, and structural adhesives.

The dash panel 130 includes an engine room barrier portion 132 that extends upward from the torque box/dash panel interface 144. The engine room barrier portion 132 may extend upward from the torque box/dash panel interface 144 to separate the cabin 108 from an engine room. The dash panel 130 further includes a floor attachment portion 134 that extends downward from the torque box/dash panel interface 144. The floor attachment portion 134 may also extend rearward of the torque box/dash panel interface 144 in the vehicle longitudinal direction and may be coupled to and/or form a portion of the floor 180 of the cabin 108.

The dash panel 130 may include a bent portion 136 that is positioned proximate to the torque box/dash panel interface 144. The bent portion 136 may separate the engine room barrier portion 132 from the floor attachment portion 134 of the dash panel 130. The engine room barrier portion 132 may extend generally upward from the bent portion 136. The bent portion 136 may redirect the dash panel 130 rearward from the engine room barrier portion 132 in the vehicle longitudinal direction to the floor attachment portion 134.

Referring to FIGS. 2-3B collectively, the vehicle 100 further includes a torque box 120. The torque box 120 generally extends in a vehicle lateral direction between the side support 112 and the rocker support 114. The torque box 120 is positioned rearward of the wheel 104 in the vehicle longitudinal direction. The torque box 120 includes an upper portion 122 and a lower portion 124. The torque box 120 is coupled to the dash panel 130 at the torque box/dash panel interface 144. The upper portion 122 of the torque box 120 may be coupled to the dash panel 130 at the torque box/dash panel interface 144. In some embodiments, the upper portion 122 of the torque box 120 may terminate at the torque box/dash panel interface 144.

The lower portion 124 of the torque box 120 may include a forward wall 123 that extends downward from the upper portion 122. In embodiments, the forward wall 123 may be generally parallel with the upper portion 122. The lower portion 124 further includes a lower wall 125 that generally extends rearward in the vehicle longitudinal direction, and may be positioned proximate to the floor 180 of the cabin 108. The lower wall 125 of the lower portion 124 may be generally transverse to the forward wall 123. In the depicted embodiments, one of the torque boxes 120 is shown. However it should be understood that the description made herein to one of the torque boxes 120 may apply to both of the torque boxes 120 that are positioned along opposite sides of the vehicle.

In embodiments, the lower portion 124 of the torque box 120 includes a reinforcement portion 126. The reinforcement portion 126 may be positioned on the forward wall 123 and/or the lower wall 125 of the lower portion 124. In some embodiments, the reinforcement portion 126 may include a reinforcement member 128 that is coupled to the forward wall 123 and/or the lower wall 125 of the lower portion. In other embodiments, the reinforcement portion 126 may include an increased cross-section portion of the torque box 120. The increased cross-section portion of the torque box 120 at the reinforcement portion 126 may have a thickness that is greater than a thickness of the upper portion 122 of the torque box 120.

The lower portion 124 of the torque box 120 has compressive strength that is evaluated in the vehicle longitudinal direction. Likewise, the upper portion 122 of the torque box 120 has a compressive strength that is evaluated in the vehicle longitudinal direction. Because the lower portion 124 of the torque box 120 includes a reinforcement portion 126, the compressive strength of the lower portion 124 of the torque box 120 is higher than the compressive strength of the upper portion 122 of the torque box.

Still referring to FIGS. 2-3B, the vehicle 100 further includes reinforcement members 150. As used herein, the reinforcement member 150 may be referred to as an "upper reinforcement member" and the reinforcement member 128 that may be coupled to the torque boxes 120 may be referred to as a "lower reinforcement member." The reinforcement members 150 are positioned between the side support 112 and the rocker support 114 in the vehicle lateral direction. In embodiments, the reinforcement members 150 are spaced apart from the side support 112 and the rocker support 114, such that the reinforcement members 150 do not contact the side support 112 and the rocker support 114. In the depicted embodiments, one of the reinforcement members 150 is shown. However it should be understood that the description made herein to one of the reinforcement members 150 may apply to both of the reinforcement members 150 that are positioned along opposite sides of the vehicle.

Referring to FIG. 3B, the reinforcement member 150 may extend between the engine room barrier portion 132 of the dash panel 130 and the floor attachment portion 134 of the dash panel in the vehicle vertical direction. The reinforcement member 150 may include a bent portion 152. The bent portion 152 of the reinforcement member 150 may be aligned with the bent portion 136 of the dash panel 130 such that the reinforcement member 150 extends between the engine room barrier portion 132 of the dash panel and the floor attachment portion 134 of the dash panel 130. In embodiments, the bent portion 152 of the reinforcement member 150 may be spaced apart from the bent portion 136 of the dash panel 130 such that there is a gap 300 between the reinforcement member 150 and the dash panel 130.

In some embodiments, a radius of curvature of the bent portion 152 of the reinforcement member 150 may be different from a radius of curvature of the bent portion 136 of the dash panel 130. In other embodiments, the radius of curvature of the bent portion 152 of the reinforcement member 150 may be approximately the same as the radius of curvature of the bent portion 136 of the dash panel 130.

The reinforcement member 150 is coupled to the dash panel 130 at a plurality of securement positions. The reinforcement member 150 may be coupled to engine room barrier portion 132 of the dash panel 130 proximate to the torque box/dash panel interface 144 at a plurality of upper securement positions 154. The reinforcement member 150 may be coupled to the floor attachment portion 134 of the dash panel 130 at a plurality of lower securement positions 156. The reinforcement member 150 may be detached from the dash panel 130 and/or the torque box 120 at a plurality of positions between the plurality of upper securement positions 154 and may be detached from the dash panel 130 at a plurality of positions between the plurality of lower securement positions 156.

The reinforcement member 150 may also be coupled to the torque box 120 proximate to the torque box/dash panel interface 144 at the plurality of upper securement positions 154. In some embodiments, the reinforcement member 150 may be directly coupled to the torque box 120 and the dash panel 130 proximate to the torque box/dash panel interface 144. For example and without limitation, the reinforcement member 150 may be welded to the dash panel 130, where the weld penetrates through the dash panel 130 to the torque box 120, thereby collectively coupling the reinforcement member 150, the dash panel 130, and the torque box 120. In other embodiments, the reinforcement member 150 may be solely coupled to the dash panel 130, and may only be coupled to the torque box 120 through the dash panel 130.

In embodiments, the plurality of upper securement positions 154 may be positioned such that the plurality of upper securement positions 154 are not higher than the torque box/dash panel interface 144 in the vehicle vertical direction. In such embodiments, the plurality of upper securement positions 154 may accordingly be positioned no higher than the torque box 120 in the vehicle vertical direction such that the reinforcement member 150 may be coupled to the torque box 120. In embodiments, the reinforcement member 150 may be coupled to the dash panel 130 and/or the torque box 120 through a variety of attachments including, for example and without limitation, welded joints, brazed joints, mechanical fasteners, and structural adhesives. The reinforcement member 150 may be formed from a variety of materials including, for example and without limitation, metals, composites, and the like.

In embodiments, the upper portion 122 of the torque box 120, the engine room barrier portion 132 of the dash panel 130, and the reinforcement member 150 have a composite compressive strength that is evaluated in the vehicle longitudinal direction at the torque box/dash panel interface 144. The reinforcement member 150 may increase the composite compressive strength of the dash panel 130 and the torque box 120 at the torque box/dash panel interface 144 as compared to a vehicle that does not include a reinforcement member 150 positioned proximate to the torque box/dash panel interface 144.

As described hereinabove, the torque box 120 has a lower compressive strength evaluated in the vehicle longitudinal direction at the upper portion 122 than at the lower portion 124 of the torque box 120. Accordingly, in vehicles that do not include a reinforcement member 150, the composite compressive strength of the dash panel 130 and the torque box 120 at the torque box/dash panel interface 144 may be lower than the compressive strength of the lower portion 124 of the torque box 120 evaluated in the vehicle longitudinal direction.

As described hereinabove, the reinforcement member 150 increases the composite compressive strength of the dash panel 130 and the upper portion 122 of the torque box 120 at the torque box/dash panel interface 144. In embodiments, the composite compressive strength of the reinforcement member 150, the dash panel 130, and the upper portion 122 of the torque box 120 together at the torque box/dash panel interface 144 is at least 30% of the compressive strength of the lower portion 124 of the torque box 120. In some embodiments, the composite compressive strength of the reinforcement member 150, the dash panel 130, and the upper portion 122 of the torque box 120 at the torque box/dash panel interface 144 may be within at least 40% of the compressive strength of the lower portion 124 of the torque box 120 including the reinforcement portion 126. In other embodiments, the composite compressive strength of the reinforcement member 150, the dash panel 130, and the upper portion 122 of the torque box 120 at the torque box/dash panel interface 144 may be within at least 43% of the compressive strength of the lower portion 124 of the torque box 120. By increasing the composite compressive strength at the torque box/dash panel interface 144, the torque box/dash panel interface 144 react in a similar manner to the introduction of energy associated with an impact as the lower portion 124 of the torque box 120, as will be described in greater detail herein.

When a vehicle is involved in a collision, vehicle structures may elastically and plastically deform to absorb energy while slowing the vehicle from its previous operating speed. The vehicle structures divert and absorb the energy associated with the moving vehicle into energy that deforms the vehicle structures. The vehicle structures may be designed to accommodate the introduction of the energy of the collision, such that the energy associated with the collision may be controllably dissipated and directed through selective and preferential deformation of the vehicle structures.

The front corner of the vehicle may strike by an object in what is referred to herein as a small front bumper overlap or a small overlap collision. In a small front bumper overlap collision, the collision occurs at an outboard portion of the vehicle (evaluated in a vehicle lateral direction), and only a portion of the front bumper strikes the object. In some small front bumper overlap collision, only about 25% of the front bumper strikes the object. In such collisions, some of the energy dissipation elements of the vehicle may not be initiated. In such collisions, the energy that is introduced to the vehicle structures may be non-symmetrical when evaluated in the vehicle lateral direction. Accordingly, the reaction of the vehicle structures to the energy introduced by the small overlap collisions may introduce a non-symmetrical response to the vehicle structures. Referring to embodiments disclosed herein, the structural members of the unibody 110 for example, may be non-symmetrically loaded when the vehicle is involved in a small overlap collision.

Referring to FIGS. 1-3B, when a vehicle strikes an object with a front corner of the vehicle, the structures of the vehicle plastically and elastically deform to absorb the energy of the impact. Because only a portion of the front bumper strikes an object during a small front bumper overlap collision, all of the energy absorbing structures associated with the front bumper may have a reduced effect on the dissipation of energy of the impact. In particular, some of the energy absorbing structures associated with the front bumper of the vehicle may not be activated or may be only partially activated, such that a portion of the energy absorbing structure of the vehicle may not dissipate energy associated with the small front bumper overlap collision. Instead, the energy from the impact may be directed into the front suspension unit 102 of the vehicle proximate to the barrier that the vehicle impacts.

Referring to FIG. 1, the energy of the small front bumper overlap collision is directed into the portion of the front bumper proximate to the barrier and to the front suspension unit 102 that is proximate to the barrier that the vehicle 100 impacts. The energy that is directed into the front suspension unit 102 may be directed into the wheel 104 through contact between the wheel 104 and the vehicle structures that are positioned forward of the wheel 104. The energy may elastically and plastically deform the front suspension unit 102. The energy may also direct the wheel 104 in a generally rearward vehicle longitudinal direction (i.e., in the + vehicle X-direction depicted in FIGS. 1-3B). The wheel 104 may continue to be directed rearward until the wheel 104 impacts the torque box 120 and/or the dash panel 130. The wheel 104 may impact the torque box 120 and/or the dash panel 130, thereby transferring energy associated with the collision into the torque box 120 and/or the dash panel 130.

The transferred energy from the wheel 104 may cause the torque box 120 and/or the dash panel 130 to plastically and elastically deform. The energy introduced to the torque box 120 and the dash panel 130 may be applied in a generally rearward direction. The energy of the collision may tend to deform the torque box 120 and/or the dash panel 130 rearward and in a direction that tends to deform the dash panel 130 into the cabin 108.

As discussed hereinabove, embodiments according to the present disclosure introduce additional structural elements to the vehicle 100 that increase the compressive strength of the surrounding components of the vehicle structure. In some embodiments, the additional structural elements recited herein may supplement the strength and/or stiffness of joints between conventionally known vehicle structures. By increasing the strength and/or stiffness at the targeted positions of the vehicle structure, the load capacity of the vehicle structures may be increased such that the vehicle structures can absorb and/or direct more energy associated with the collision. By increasing the load capacity of the vehicle structures, the energy associated with the collision may be directed away from the passengers in the cabin 108. Further, the energy associated with the collision may be shielded from the targeted regions of the cabin 108.

As described hereinabove, a reinforcement member 150 is coupled to the dash panel 130 and/or the torque box 120. As also described hereinabove, the reinforcement member 150 increases the composite compressive strength of the dash panel 130 and the upper portion 122 of the torque box at the torque box/dash panel interface 144 such that torque box/dash panel interface 144 and the lower portion 124 of the torque box may react in a similar manner to the introduction of energy. Because the torque box/dash panel interface 144 and the lower portion 124 of the torque box 120 may react in a similar manner to the introduction of energy, stress in the connection between the dash panel 130 and the upper portion 122 of the torque box 120 may be minimized. By minimizing the stress in the connection between the dash panel 130 and the upper portion 122 of the torque box 120, the likelihood of separation of the dash panel 130 from the torque box 120 is minimized.

By minimizing the likelihood of separation of the dash panel 130 from the torque box 120, energy from a collision, such as a small front bumper overlap collision, may be distributed between the torque box 120 and the dash panel 130. By distributing energy from the collision among the torque box 120 and the dash panel 130, as well as increasing the compressive strength of the dash panel 130 at the torque box/dash panel interface 144, intrusion of the dash panel 130 into the cabin 108 may be minimized.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
    a side support extending in a vehicle longitudinal direction;
    a rocker support extending in the vehicle longitudinal direction, wherein the rocker support is positioned outboard of the side support in a vehicle lateral direction that is transverse to the vehicle longitudinal direction;
    a torque box extending between the side support and the rocker support in the vehicle lateral direction;
    a dash panel coupled to the torque box, wherein the dash panel comprises an engine room barrier portion extending upward from the torque box and a floor attachment portion extending downward from the torque box;
    a wheel positioned forward of the torque box in the vehicle longitudinal direction; and
    a reinforcement member positioned between the side support and the rocker support, wherein the reinforcement member is spaced apart from the side support and the rocker support, and wherein the reinforcement member is coupled to the engine room barrier portion of the dash panel and the floor attachment portion of the dash panel.

2. The vehicle of claim 1, wherein the dash panel further comprises a bent portion that is positioned between the engine room barrier portion and the floor attachment portion.

3. The vehicle of claim 2, wherein the reinforcement member comprises a bent portion that is aligned with the bent portion of the dash panel.

4. The vehicle of claim 3, wherein the bent portion of the reinforcement member is spaced apart from the bent portion of the dash panel.

5. The vehicle of claim 1, wherein the reinforcement member is coupled to the dash panel at a plurality of securement positions on the engine room barrier portion, wherein the plurality of securement positions are positioned no higher than the torque box.

6. The vehicle of claim 1, wherein the reinforcement member is coupled to the dash panel and the torque box at a plurality of securement positions.

7. The vehicle of claim 6, wherein the reinforcement member is detached from the dash panel and the torque box at a plurality of positions between the plurality of securement positions.

8. The vehicle of claim 1, wherein the reinforcement member is an upper reinforcement member, the vehicle further comprising a lower reinforcement member that is positioned on a forward wall and a lower wall of a lower portion of the torque box.

9. A vehicle comprising:
    a side support extending in a vehicle longitudinal direction;
    a rocker support extending in the vehicle longitudinal direction, wherein the rocker support is positioned outboard of the side support in a vehicle lateral direction that is transverse to the vehicle longitudinal direction;
    a torque box extending between the side support and the rocker support in the vehicle lateral direction, the torque box comprising an upper portion and a lower portion, wherein the upper portion of the torque box has a compressive strength that is less than a compressive strength of the lower portion of the torque box;
    a dash panel coupled to the upper portion of the torque box, wherein the dash panel comprises an engine room barrier portion extending upward from the torque box and a floor attachment portion extending downward from the torque box;
    a wheel positioned forward of the torque box in the vehicle longitudinal direction; and
    a reinforcement member coupled to the dash panel and the upper portion of the torque box, wherein the reinforcement member, the dash panel, and the upper portion of the torque box together have a composite compressive strength that is at least 30% of the compressive strength of the lower portion of the torque box.

10. The vehicle of claim 9, wherein the composite compressive strength of the reinforcement member, the dash panel, and the upper portion of the torque box is at least 40% of the compressive strength of the lower portion of the torque box.

11. The vehicle of claim 9, wherein the reinforcement member is positioned between the side support and the rocker support.

12. The vehicle of claim 9, wherein the reinforcement member is spaced apart from the side support and the rocker support.

13. The vehicle of claim 9, wherein the dash panel further comprises a bent portion positioned between the engine room barrier portion and the floor attachment portion.

14. The vehicle of claim 9, wherein the reinforcement member comprises a bent portion that is aligned with the bent portion of the dash panel.

15. The vehicle of claim 14, wherein the bent portion of the reinforcement member is spaced apart from the bent portion of the dash panel.

16. The vehicle of claim 9, wherein the reinforcement member is coupled to the dash panel at a plurality of securement positions on the engine room barrier portion, wherein the plurality of securement positions are positioned no higher than the torque box.

17. The vehicle of claim 9, wherein the reinforcement member is coupled to the dash panel and the torque box at a plurality of securement positions.

18. The vehicle of claim 17, wherein the reinforcement member is detached from the dash panel and the torque box at a plurality of positions between the plurality of securement positions.

19. The vehicle of claim 9, wherein the reinforcement member is an upper reinforcement member, the vehicle further comprising a lower reinforcement member that is positioned on a forward wall and a lower wall of the lower portion of the torque box.

\* \* \* \* \*